(12) United States Patent
Matsugatani et al.

(10) Patent No.: US 7,209,465 B2
(45) Date of Patent: Apr. 24, 2007

(54) WIRELESS COMMUNICATION SYSTEM HAVING COMMUNICATION SYSTEM SWITCHING FUNCTION

(75) Inventors: Kazuoki Matsugatani, Kariya (JP); Masumi Egawa, Handa (JP)

(73) Assignee: DENSO Corporation, Kariya (JP)

( * ) Notice: Subject to any disclaimer, the term of this patent is extended or adjusted under 35 U.S.C. 154(b) by 1142 days.

(21) Appl. No.: 10/024,748

(22) Filed: Dec. 19, 2001

(65) Prior Publication Data

US 2002/0080778 A1    Jun. 27, 2002

(30) Foreign Application Priority Data

Dec. 22, 2000    (JP)    ............... 2000-391124

(51) Int. Cl.
*H04Q 7/24* (2006.01)
*H04L 12/28* (2006.01)
*H04L 12/66* (2006.01)
*G01S 1/00* (2006.01)

(52) U.S. Cl. .............. 370/338; 370/351; 370/401; 455/414.2; 455/456.3; 455/456.5; 342/357.09; 342/357.1

(58) Field of Classification Search ............... 370/338, 370/351, 401; 455/414.2, 456.3, 456.5; 342/357.09, 357.1
See application file for complete search history.

(56) References Cited

U.S. PATENT DOCUMENTS

| | | | |
|---|---|---|---|
| 5,956,331 A * | 9/1999 | Rautiola et al. ............ 370/338 |
| 6,122,263 A | 9/2000 | Dahlin et al. |
| 6,256,498 B1 * | 7/2001 | Ludwig .................... 455/433 |
| 6,278,706 B1 | 8/2001 | Kendrick et al. |
| 6,320,873 B1 | 11/2001 | Nevo et al. |
| 6,493,557 B1 | 12/2002 | Yoshida |
| 6,625,135 B1 * | 9/2003 | Johnson et al. ............ 370/332 |
| 6,677,894 B2 * | 1/2004 | Sheynblat et al. ....... 342/357.1 |
| 6,771,609 B1 * | 8/2004 | Gudat et al. ............... 370/254 |
| 6,973,057 B1 * | 12/2005 | Forslow ..................... 370/328 |
| 6,980,801 B1 * | 12/2005 | Soininen et al. ......... 455/435.1 |
| 2002/0049059 A1 * | 4/2002 | Soininen et al. ........... 455/439 |
| 2002/0122394 A1 * | 9/2002 | Whitmore et al. ........... 370/328 |

(Continued)

FOREIGN PATENT DOCUMENTS

EP    0 998 094    5/2000

(Continued)

OTHER PUBLICATIONS

Office Action dated Nov. 6, 2003 in the corresponding European Application No. EP 01 12 9881.

(Continued)

*Primary Examiner*—Alpus H. Hsu
(74) *Attorney, Agent, or Firm*—Harness, Dickey & Pierce, PLC

(57) ABSTRACT

Base stations of a communication system belong to a sub-network, which is connected to the Internet by way of a gateway. Base stations of another communication system belong to sub-network, which is connected to the Internet by way of another gateway. A mobile terminal communicates with a server by using one of the communication systems. In this case, the mobile terminal includes mobile station network interfaces which can access to the communication systems, and is designed to switch communication systems by means of a communication system switching unit.

6 Claims, 15 Drawing Sheets

U.S. PATENT DOCUMENTS

2003/0179742 A1* 9/2003 Ogier et al. ............. 370/351

FOREIGN PATENT DOCUMENTS

| EP | 1009141 | 6/2000 |
| --- | --- | --- |
| EP | 1011243 | 6/2000 |
| EP | 1 207 708 | 5/2002 |
| JP | 4-242353 | 8/1992 |
| JP | A-2000-183974 | 6/2000 |
| JP | A-2000-183975 | 6/2000 |
| JP | 2000-316178 | 11/2000 |
| WO | WO 00/38465 | 6/2000 |
| WO | WO 00/76145 | 12/2000 |
| WO | WO 01/72076 | 9/2001 |

OTHER PUBLICATIONS

Office Action dated Oct. 7, 2003 in Japanese application No. JP2000-391124 and English translation.

Examination Report in the corresponding European application No. 01 129 881.7 dated Sep. 11, 2006.

* cited by examiner

FIG. 16A

ROUTING TABLE R1 OF GW1

| NETWORK | DEVICE |
|---|---|
| SN1 | dev1-1 |
| SN3 | dev1-1 |
| OTHER | dev1-0 |

ROUTING TABLE R2 OF GW2

| NETWORK | DEVICE |
|---|---|
| SN2 | dev2-2 |
| OTHER | dev2-0 |

ROUTING TABLE R3 IN TERMINAL

| NETWORK | DEVICE |
|---|---|
| SN3 | dev3-3 |
| OTHER | dev3-1 |

FIG. 16B

ROUTING TABLE R1 OF GW1

| NETWORK | DEVICE |
|---|---|
| SN1 | dev1-1 |
| OTHER | dev1-0 |

ROUTING TABLE R2 OF GW2

| NETWORK | DEVICE |
|---|---|
| SN2 | dev2-2 |
| SN3 | dev2-2 |
| OTHER | dev2-0 |

ROUTING TABLE R3 IN TERMINAL

| NETWORK | DEVICE |
|---|---|
| SN3 | dev3-3 |
| OTHER | dev3-2 |

WIRELESS COMMUNICATION SYSTEM HAVING COMMUNICATION SYSTEM SWITCHING FUNCTION

CROSS REFERENCE TO RELATED APPLICATION

This application is based on and incorporates herein by reference Japanese Patent Application No. 2000-391124 filed on Dec. 22, 2000.

BACKGROUND OF THE INVENTION

The present invention relates to a plurality of different wireless communication systems and a mobile terminal therefor capable of switching communication systems.

Conventional wireless communication systems, which control the data delivery route, i.e., routing, for moving users are disclosed in JP-A No. 2000-183974 and No. 2000-183975. These systems are designed to group several base stations into one domain and control routing by using the technique of mobile IP for access between different domains. These systems can perform the routing efficiently within a domain and between the domains. However, the base stations are part of a single communication system, and existing techniques do not address the case of data delivery routing among different communication systems.

Currently available digital cellular systems provide data communication as well as voice communication. To better meet the demands of data communication, higher rate transmission is under study.

The trend of wireless high-speed data communication is for each communication cell to handle higher bandwidth data transmissions using a proportionately wider radio frequency bandwidth for transmission at higher data rates, and the inevitable use of higher radio carrier frequencies results in a shorter radio signal range. Consequently, the cell size becomes smaller. These high-speed data communication systems will coexist with existing wireless communication systems. Specifically, there will coexist communication systems that are high in speed but short range in service area and allocated in a spot-wise fashion. Other communication systems which are low in speed but wider in range are allocated in overlapping, wide-area coverage fashion.

SUMMARY OF THE INVENTION

Accordingly, it is an object of the present invention to provide a wireless communication system, a network, and a mobile terminal for use with multiple types of wireless communication systems and all designed to perform communication without interruption while switching communication systems.

According to the present invention, wireless communication is enabled for a mobile terminal by using a plurality of communication systems that are different from each other. The base stations of each communication system belong to a sub-network which is unique to that communication system, and each sub-network is connected to the Internet by way of a gateway provided for the sub-network. The mobile terminal has a plurality of mobile station network interfaces which can access the respective plurality of communication systems.

The mobile terminal has a switching function that switches the communication systems accessed by the mobile station network interfaces depending on communication quality of the communication systems.

Alternately, the mobile terminal may have a switching function to switch the communication systems depending on cell position information of cells which are formed by the base stations of the communication systems, the present location of the mobile terminal, and depending on the cell at the present location.

Furthermore the mobile terminal may have a switching unit with a router function located between the mobile station network interfaces and a section of running application software, thereby switching the communication systems by connecting the application software running section to any one of the multiple mobile station network interfaces.

BRIEF DESCRIPTION OF THE DRAWINGS

The above and other objects, features and advantages of the present invention will become more apparent from the following detailed description made with reference to the accompanying drawings. In the drawings

FIGS. 16A and 16B are data tables showing the relation between networks and devices in the third embodiment;

DETAILED DESCRIPTION OF THE PREFERRED EMBODIMENTS

The present invention will be described in greater detail with reference to various embodiments.

(First Embodiment)

Figure 1:
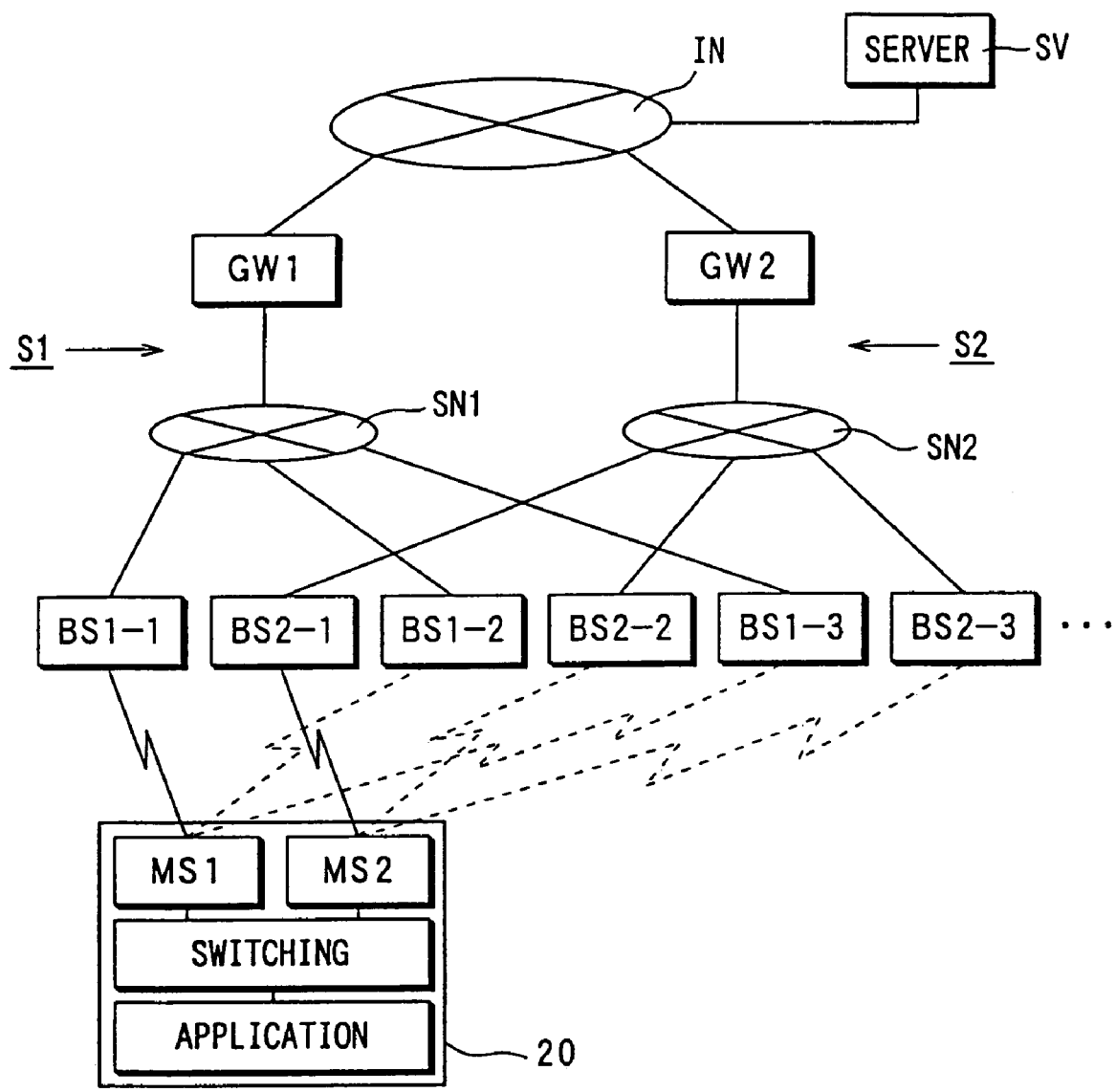
FIG. 1 is a schematic diagram showing a wireless communication system based on a first embodiment of the present invention.
Figure 2:
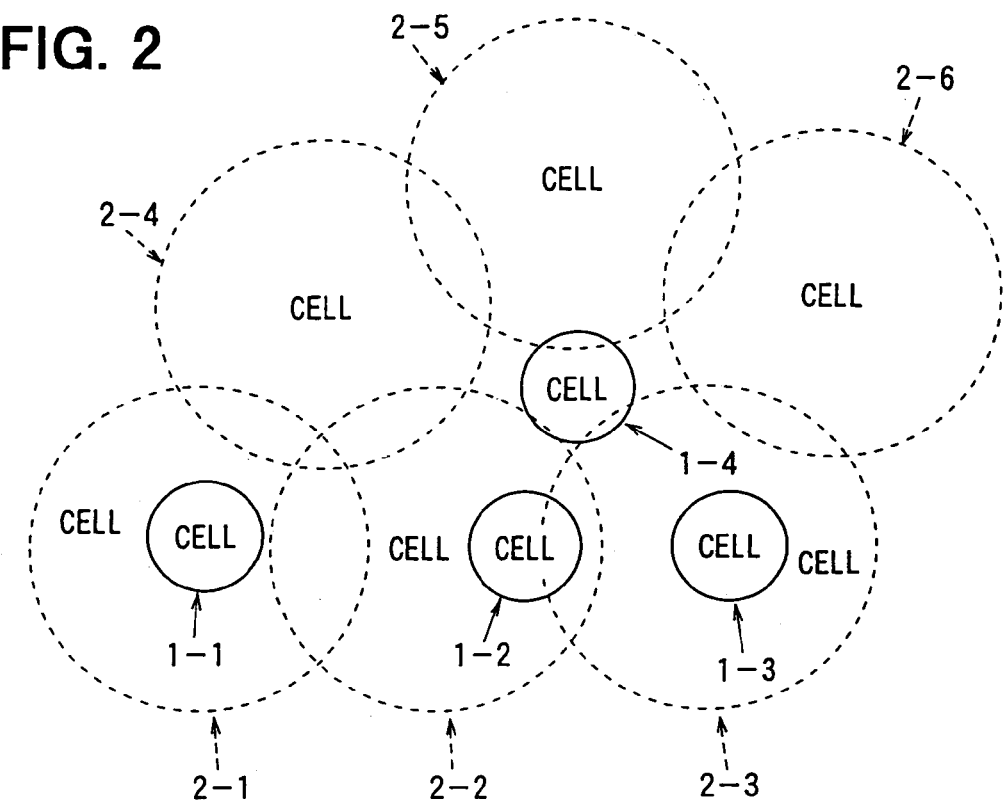
FIG. 2 is a schematic diagram showing cells formed by base stations in the first embodiment.

Referring first to FIG. 1, a wireless communication system has communication systems S1 and S2. The communication system S1 is a system, such as the DSRC (dedicated short-range communication) or wireless LAN for example, which provides high data speed communication, but has small range and cell size. The communication system S2 is a system, such as the cellular phone or PHS (Personal Handyphone Service), which provides low rate data communication but large cell sizes for wide-area communication service that in places may geographically overlap the communication system S1 service. For example, the communication system S1 performs high-speed communication in narrow cells 1-1, 1-2, 1-3, 1-4, etc. which are allocated in spot-wise fashion as shown in FIG. 2, while the communication system S2 performs relatively low speed communication in wide cells 2-1, 2-2, 2-3, 2-4, 2-5, 2-6, etc. which are allocated in an overlapping, wide-area coverage fashion.

Communication system S1 has base stations BS1-1, BS1-2, BS1-3, etc. which belong to the same sub-network SN1. The sub-network SN1 is connected to the Internet IN by way of a gateway GW1. Communication system S2 has base stations BS2-1, BS2-2, BS2-3, etc. which belong to the same sub-network SN2. Sub-network SN2 is connected to the Internet IN by way of a gateway GW2. A mobile terminal 20 makes access to a server SV via the Internet IN by using one of the communication systems S1 and S2.

The mobile terminal 20 is designed to perform communication by using one of the communication systems S1 and S2 based on the provision of a mobile station network interface MS1 that can access communication system S1 and a mobile station network interface MS2 which can access communication system S2. In this case, the mobile station network interface MS1 makes access by using the IP (Internet IN) address of sub-network SN1. The mobile station network interface MS2 makes access by using the IP address of sub-network SN2.

The mobile terminal 20, which communicates with one of the base stations BS1-1, BS1-2, BS1-3, etc. by using communication system S1 and with one of the base stations BS2-1, BS2-2, BS2-3, etc. by using communication system S2, has its communication partner in each communication system determined by roaming. Roaming is the scheme of handing over communication among different base stations within the same communication system.

Figure 3:
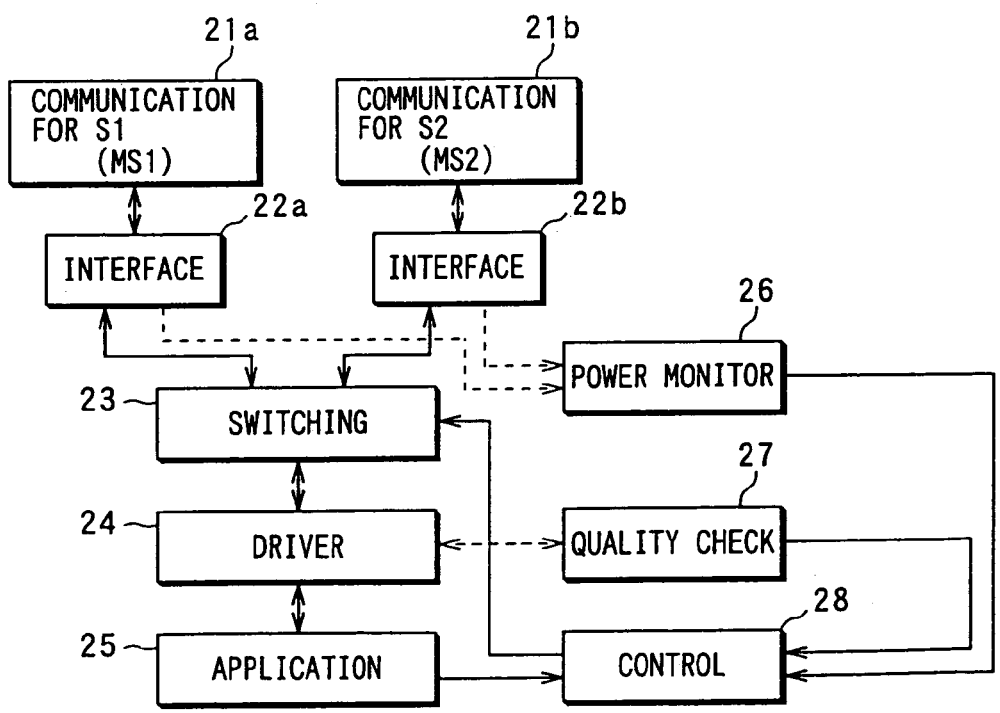
FIG. 3 is a block diagram showing a mobile terminal in the first embodiment.

FIG. 3 shows the specific arrangement of the mobile terminal 20. Mobile terminal 20 is made up of communication units 21a and 21b which are the mobile station network interfaces MS1 and MS2 mentioned above, line interfaces 22a and 22b which transact signals between communication units 21a and 21b and the functional sections in mobile terminal 20, a communication system switching unit 23, a network driver 24, an application unit 25, a receiving power monitor 26, a communication quality checking unit 27, and a control unit 28. Although the functional sections of mobile terminal 20 are shown by blocks in the figure, the functions of these sections can be accomplished by means of a general purpose computer, a microprocessor, or hardwired logic circuits.

Communication system switching unit 23 operates based on the standby/send-receive switching signal from control unit 28 to bring each of the communication units 21a and 21b into the send/receive-enabled state (active state) or the standby state (inactive state) by way of the interfaces 22a and 22b, respectively. In the standby state, the communication unit can receive but cannot send information.

In the following explanation, the send/receive-enabled state of the communication unit 21a or 21b is the send/receive-enabled state of the communication system S1 or S2, respectively, and the standby state of the communication unit 21a or 21b is the standby state of the communication system S1 or S2, respectively.

The receiving power monitor 26 detects the signal strength received by communication units 21a and 21b, i.e., corresponding to transmissions by communication systems S1 and S2, respectively, by way of the interfaces 22a and 22b, respectively. The communication quality checking unit 27 assesses the communication quality of the communication unit which is in current use among the communication units 21a and 21b. The checking of communication quality can be in terms of bit error rate (BER), for example.

The application unit 25 includes various application software for running Web browser, electronic mail, or other user applications, so that communication takes place via the application software. In this case, information indicative of the mode of communication, i.e., sending or receiving, is sent to the control unit 28.

Figure 4:
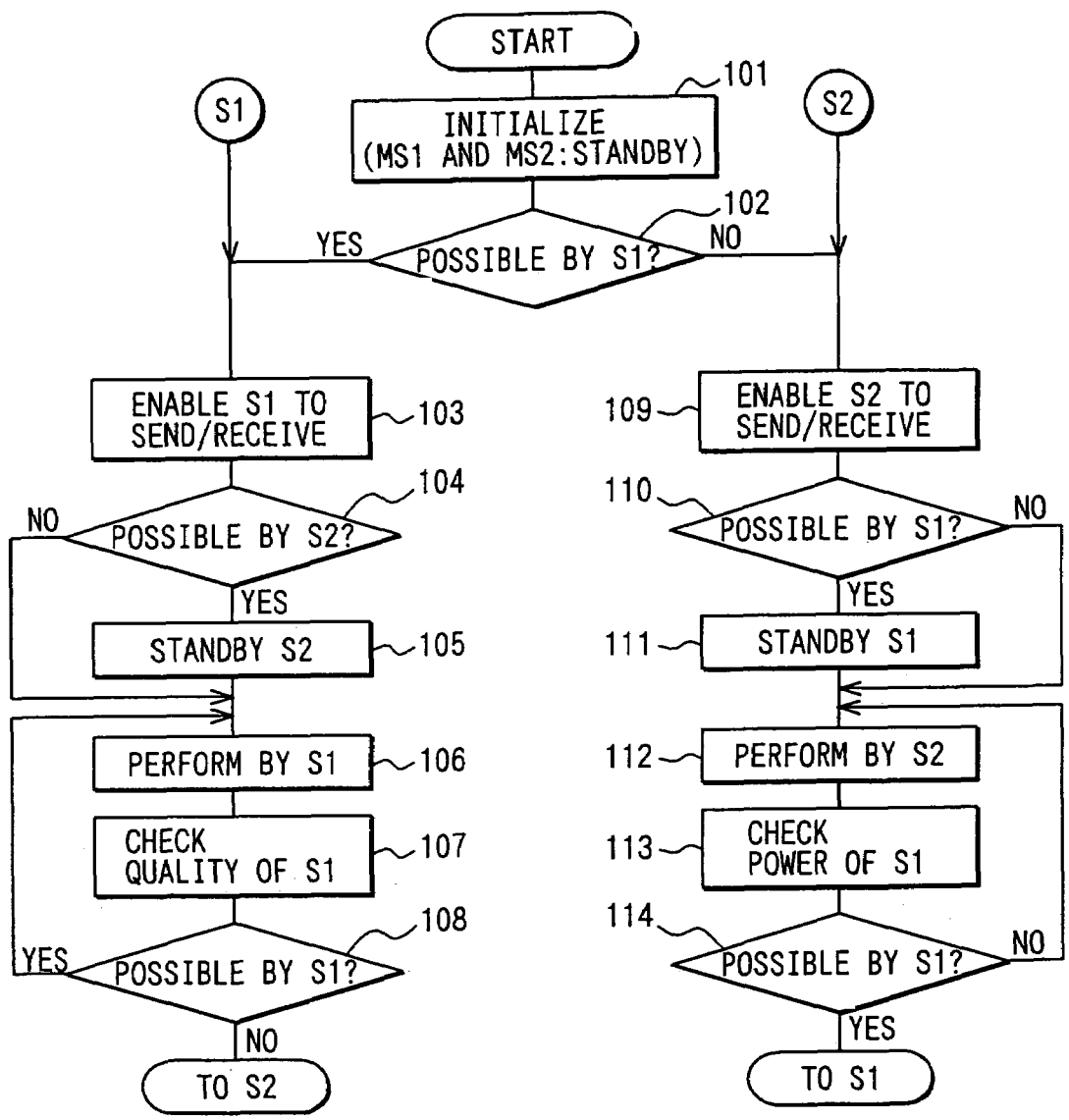
FIG. 4 is a flowchart showing control processing of a control unit in the first embodiment.

The control unit 28 directs one of the communication systems S1 and S2 into the send/receive-enabled state and the other into the standby state in response to the output signal of the receiving power monitor 26 and the output signal of the communication quality checking unit 27. FIG. 4 shows the control processing.

Initially, the control unit 28 executes the initialization processing to bring communication systems S1 and S2 into the standby state (step 101). Next, it determines as to whether or not communication by use of communication system S1 is possible, based on the receiving power of communication system S1 detected by the receiving power monitor 26 (step 102).

In case the mobile terminal 20 is located in any of the narrow cells 1-1, 1-2, 1-3, 1-4, etc. and communication by use of communication system S1 is possible, control unit 28 brings the communication system S1 into the send/receive-enabled state (step 103).

Next, control unit 28 determines whether or not communication system S2 is in the send/receive-enabled state (step 104). At the first-time determination of the step 104, communication system S2 is in the standby state by the initializing processing, and the result of determination is "NO". At a following determination of the step 104 after subsequent processing, if communication system S2 is in the send/receive-enabled state, control unit 28 brings communication system S2 into the standby state (step 105).

Control unit 28 directs the network driver 24 to perform communication by using the communication system S1 (step 106). It checks communication quality by the communication quality checking unit 27 during the communication by use of the communication system S1 (step 107), and determines, based on the checking of communication quality, whether or not communication by use of the communication system S1 can be maintained (step 108) In case communication using communication system S1 is possible, it repeats the processing from step 106 to step 108.

When the mobile terminal 20 moves off the narrow cell, where it has been located, and communication by use of communication system S1 can no longer be maintained, it brings communication system S2 into the send/receive-enabled state (step 109).

In the case that communication system S1 is in the send/receive-enabled state ("YES" at step 110), it brings communication system S1 into the standby state (step 111). Subsequently, it controls the network driver 24 so as to perform communication using communication system S2 (step 112). It checks received signal strength for communication system S1 from receiving power monitor 26 (step 113), and determines, based on the received signal strength, whether or not communication by use of communication system S1 can be started (step 114). In case communication by use of communication system S1 cannot be started, it repeats the processing from step 112 to step 114.

After that, when the mobile terminal 20 enters any narrow cell again and control unit 28 determines that communication by use of communication system S1 can be started, it proceeds to step 103 to perform communication by using the communication system S1.

Based on this control, a high-speed communication system is used with high priority thereby enhancing the overall transmission efficiency and unused communication systems are brought to the standby state so that the power consumption is reduced.

Figure 5:
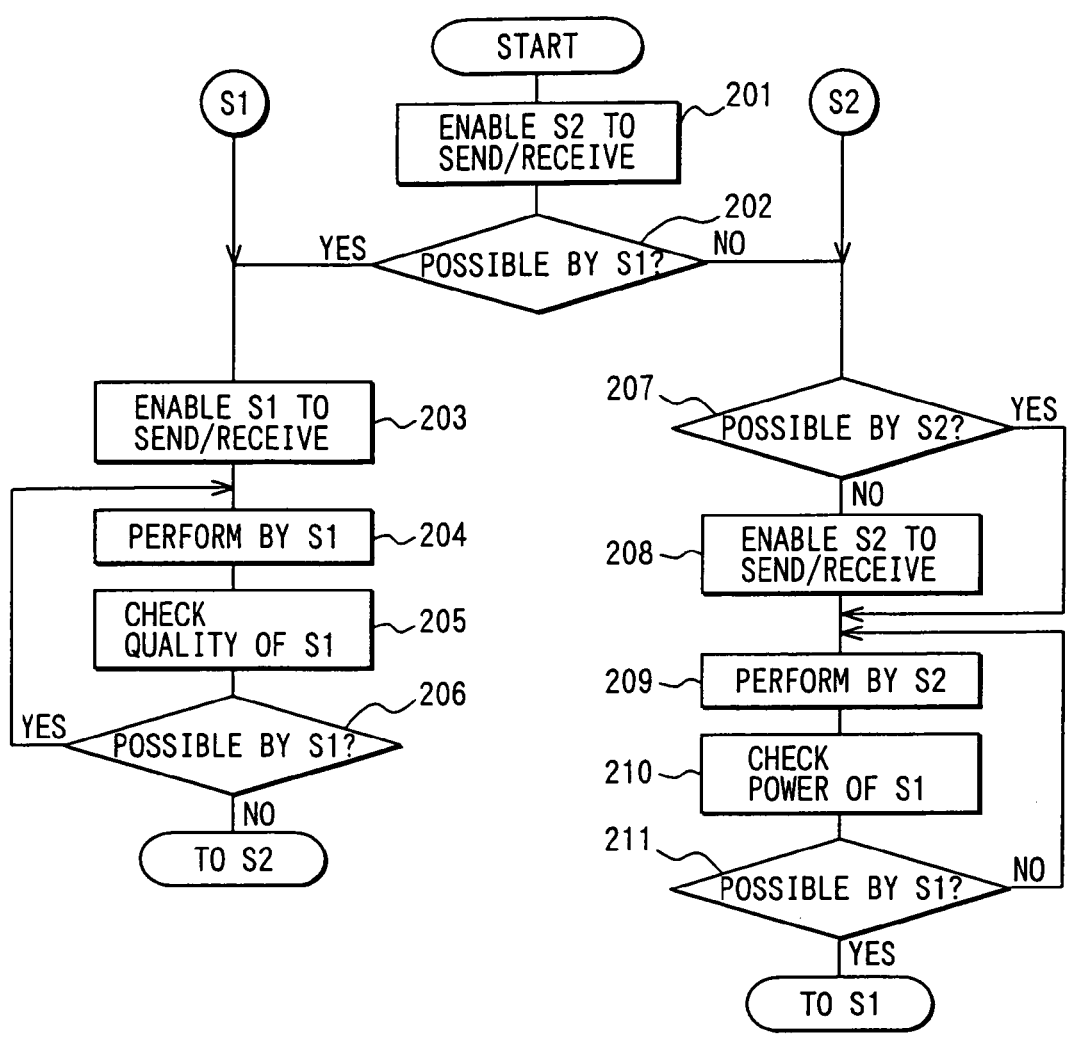
FIG. 5 is a flowchart showing another control processing of the control unit in the first embodiment.

Although in the foregoing embodiment, one of the communication systems S1 and S2 is brought into the send/receive-enabled state and the other is brought into the standby state, an alternative scheme is to keep both communication systems S1 and S2 in the send/receive-enabled state. In this scheme, the communication system S1 is used for communication if it is possible, and the communication system S2 is used for communication if communication by use of the communication system S1 cannot be maintained. FIG. 5 shows the control processing of the control unit 28 in this case.

Initially, the control unit 28 implements the initialization processing to bring communication system S2 into the send/receive-enabled state (step 201). Next, it determines whether or not communication by use of communication system S1 is possible based on the received signal strength of communication system S1 detected by the receiving power monitor 26 (step 202).

In case communication by use of communication system S1 is possible, it brings communication system S1 into the send/receive-enabled state (step 203). The control unit 28 controls the network driver 24 to perform communication by using communication system S1 (step 204). It checks communication quality by the communication quality checking unit 27 during communication by use of the communication system S1 (step 205). It determines, based on the checking of communication quality, whether or not communication by use of the communication system S1 can be maintained (step 206). In case communication by use of communication system S1 is possible, it repeats the processing from step 204 to step 206.

When communication using communication system S1 can no longer be maintained, the control unit 28 determines whether or not communication system S2 is in the send/receive-enabled state (step 207). This is to check whether or not communication system S2 service is currently available. If communication system S2 is not in the send/receive-enabled state, control unit 28 brings communication system S2 into the send/receive-enabled state (step 208).

Control unit 28 controls the network driver 24 so as to perform communication by using the communication system S2 (step 209). It checks received signal strength for communication system S1 from receiving power monitor 26 (step 210). It determines, based on the received signal strength, whether or not communication using communication system S1 can be started (step 211). In case communication using communication system S1 cannot be started, it repeats the processing from step 209 to step 211.

After that, when the control unit 28 determines that communication by use of communication system S1 can be started, it proceeds to the foregoing step 203 thereby enabling communication using the communication system S1.

Based on this control, communication system S2, which can perform communication in a wide service area cell, is kept active as backup system. Consequently, momentary interruption of communication in the event of switching of communication systems can be prevented.

Although the foregoing embodiment describes the case of two communication systems, three or more communication systems may be included, with these communication systems being preferentially selected in the order of decreasing data communication rate capabilities.

As described, this embodiment enables the mobile terminal 20, wherever it may move, to perform communication based on the selection of the fastest communication system that is currently available at the current location. Providing the communication systems with individual sub-networks facilitates the routing of communication with the mobile terminal 20.

In the foregoing case of using two communication systems S1 and S2, the up-link communication from the mobile terminal 20 to the server SV can take place as usual since the use of which communication system is known by the mobile terminal 20. However, the down-link communication from the server SV to the mobile terminal 20 requires routing to determine which of the communication systems S1 and S2 be used.

Figure 6:
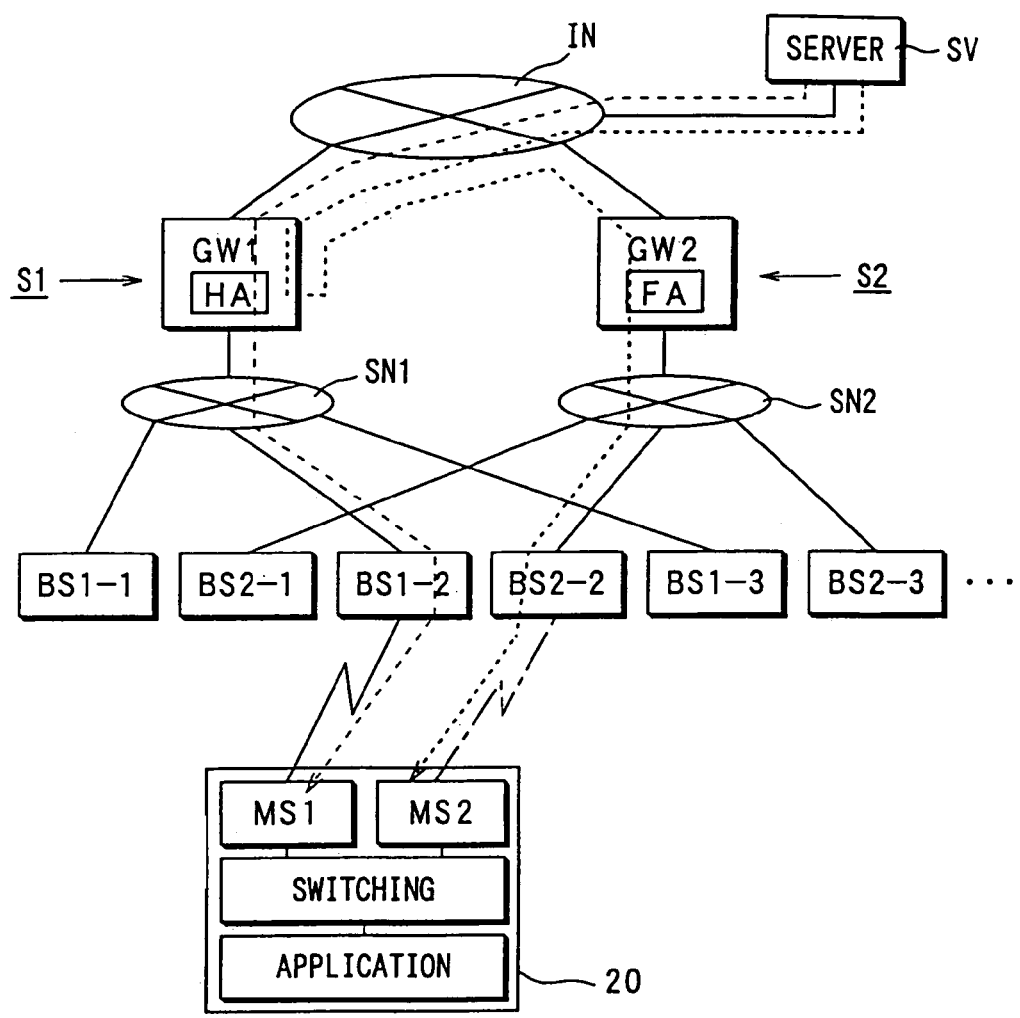
FIG. 6 is a schematic diagram showing routing of down-link in the first embodiment.
Figure 7:
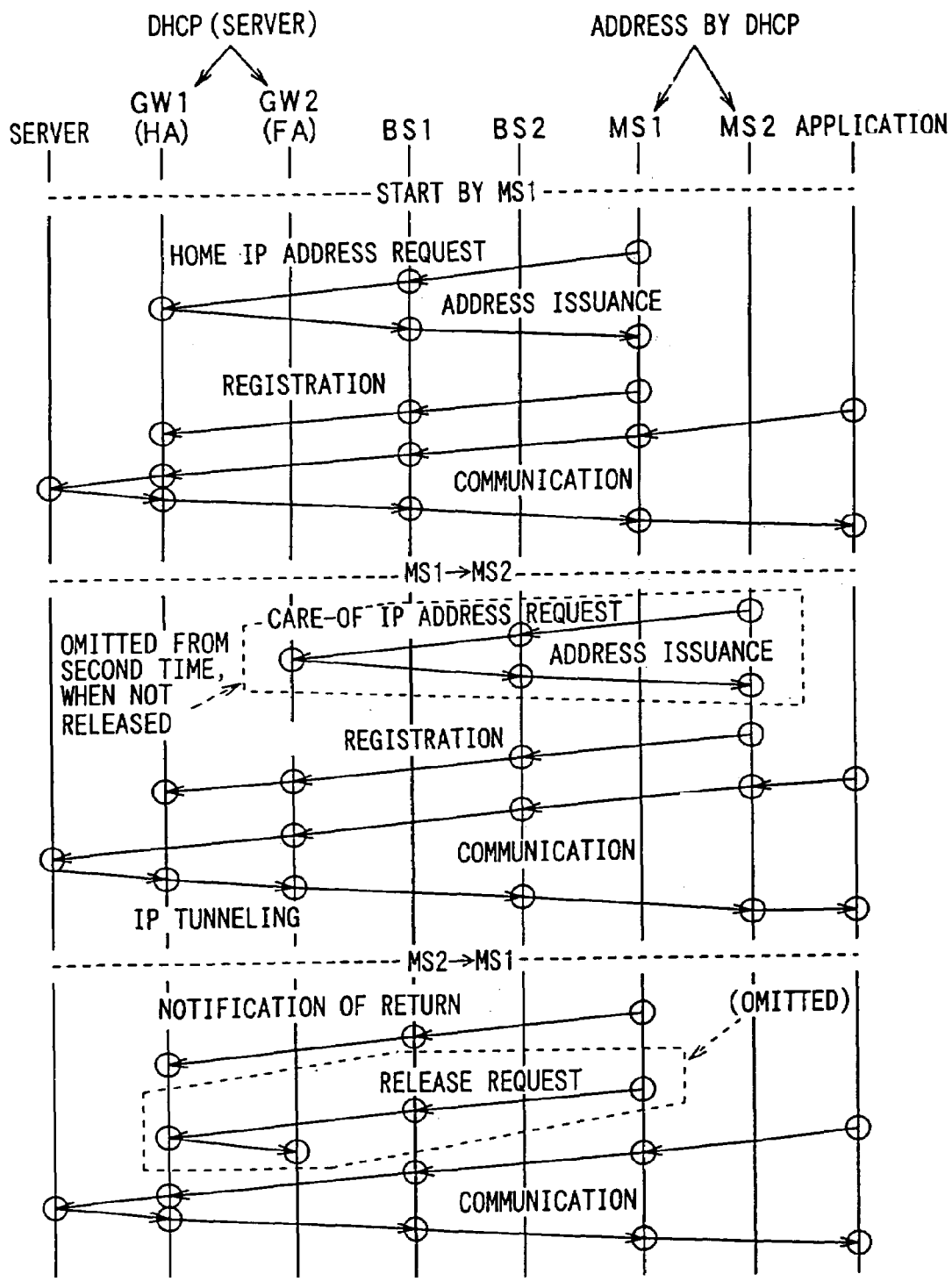
FIG. 7 is an operation diagram showing a signal transaction during the routing of down-link in the first embodiment.
Figure 8:
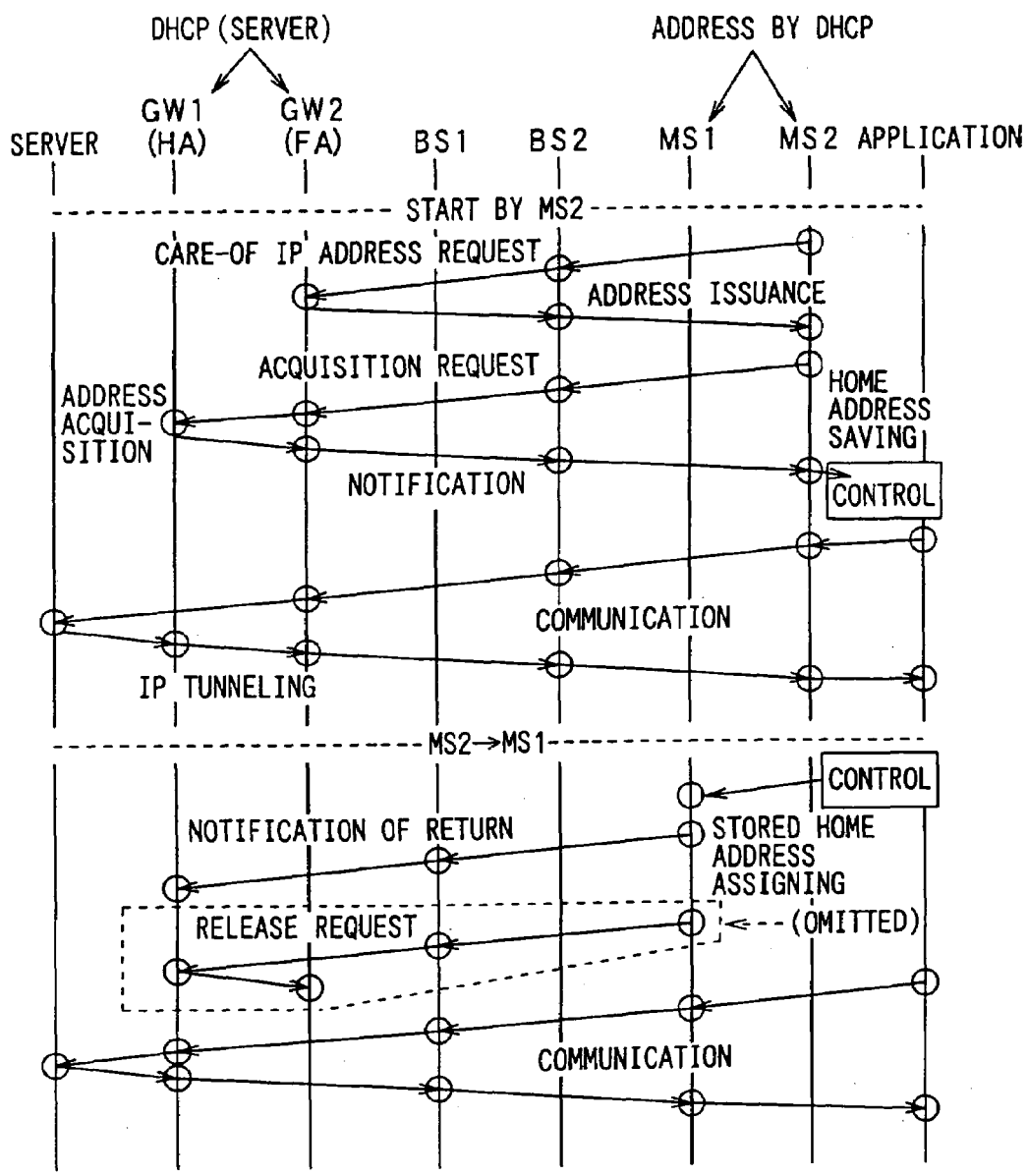
FIG. 8 is an operation diagram showing another signal transaction during the routing of down-link in the first embodiment.

The following explains the routing for the down-link communication. For implementing the routing, this embodiment uses the technique of mobile IP. As shown in FIG. 6, a home agent HA is installed in the gateway GW1 of the sub-network SN1 to which communication system S1 belongs, and a foreign agent FA is installed in the gateway GW2 of the sub-network SN2 of communication system S2. In case the mobile terminal 20 is located within the service area of communication system S1, access is made by using a home address. In case the mobile terminal 20 is located within the service area of communication system S2, access is made by using a care-of address determined by the foreign agent FA. FIG. 7 and FIG. 8 show the transaction of signals in this case. This embodiment is based on the assumption that both gateways GW1 and GW2 also function as DHCP (Dynamic Host Configuration Protocol) server SVs.

FIG. 7 shows the case where the mobile terminal 20, at the time of starting, can use communication system S1. Initially, mobile terminal 20 requests the home agent HA by using the communication system S1 to issue a home IP address. The gateway GW1, which also functions as DHCP server SV, responds to the request to issue a home IP address to mobile terminal 20. Next, mobile terminal 20 registers the home address in the home agent HA. After that, mobile terminal 20 can communicate with the server SV for both the up-link and down-link by using the home address. In this case, communication takes place based on the application software.

When mobile terminal 20 switches from communication system S1 to communication system S2, it requests the foreign agent FA by using communication system S2 to issue a care-of address. The gateway GW2, which also functions as DHCP server SV, responds to the request to issue a care-of IP address to mobile terminal 20. Next, mobile terminal 20 registers the care-of IP address in the home agent HA. In this case, the care-of IP address is transferred from the foreign agent FA to the home agent HA via the Internet IN. After that, mobile terminal 20 can communicate on the up-link with the server SV by using the home address. For the down-link, the server SV makes transmission to the home agent HA via the Internet IN by using the home address, the home agent HA makes transmission by using the care-of IP address to the foreign agent FA via the Internet IN. The foreign agent FA makes transmission to mobile terminal 20 via the base station BS2. Accordingly, for the down-link, the server SV makes transmission to mobile terminal 20 based on IP tunneling of the home agent HA and foreign agent FA.

After that, when mobile terminal 20 switches from communication system S2 to communication system S1, it indicates the return to the home segment (communication by use of communication system S1) to the home agent HA by using communication system S1. In this case, the IP address, which is no longer used, may be released (given back). This scheme improves the efficiency of use of the IP address space. In case the IP address is released, however, it is necessary to get the above care-of IP address again at the time of switching to communication system S2. However, in case the IP address is not released, it is not necessary to get the care-of IP address again.

After that, mobile terminal 20 can communicate with the server SV by using the home address for both the up-link and down-link.

FIG. 8 shows the case where mobile terminal 20, at the time of starting, cannot use communication system S1. Initially, the mobile terminal 20 requests the foreign agent FA by using communication system S2 to issue a care-of IP address. The foreign agent FA responds to the request to issue a care-of IP address to mobile terminal 20. Next, mobile terminal 20 requests a home address. This request is sent from the foreign agent FA to the home agent HA via the Internet IN, and a home address is acquired. The home address is notified from the home agent HA to mobile terminal 20 via the foreign agent FA and via the base station BS2. Mobile terminal 20 saves the acquired home address by using the control program. In the case of having communication, mobile terminal 20 makes transmission on the up-link to the server SV by using the home address, and the server SV makes transmission on the down-link to mobile terminal 20 by using IP tunneling of the foreign agent FA.

When mobile terminal 20 switches from communication system S2 to communication system S1, it uses the home address, which has been saved by the control program, to notify from communication system S1 to the home agent HA the return to the home segment. In this case, the IP address, which is no longer used, may be released. After that, mobile terminal 20 can communicate with the server SV by using the home address on both the up-link and down-link as described above.

Although the foregoing embodiment is the case of two communication systems, if three or more communication systems are included, a home agent HA is installed in the sub-network to which the communication system of the highest communication speed belongs, and foreign agents FA are installed in sub-networks to which other communication systems belong.

Based on the use of mobile IP technique, data connection can be maintained even in the event of switching of communication systems. Based on the installation of the home agent HA in the sub-network to which the communication system of the highest communication speed belongs, the overhead at the time of high-speed access can be suppressed. Conversely, in case communication is taking place by use of a low-speed communication system, the influence of overhead can be reduced even by making transmission via the home agent HA temporary due to the inherent low communication speed. The "overhead" is due to the transmission of data by way of another agent.

Based on the assumption that both of the gateways GW1 and GW2 function also as DHCP server SVs, and that mobile terminal 20 checks IP addresses temporarily used for the mobile station network interfaces MS1 and MS2 from the DHCP server SVs, it is possible to improve efficiency of use of the IP address space and eliminate the task of address issuance. An alternative scheme is to use fixed addresses for communication systems S1 and S2, and give the addresses to mobile terminal 20 in advance. This scheme eliminates the time expenditure of address issuance and enables smooth switching of communication systems.

(Second Embodiment)

Figure 9:
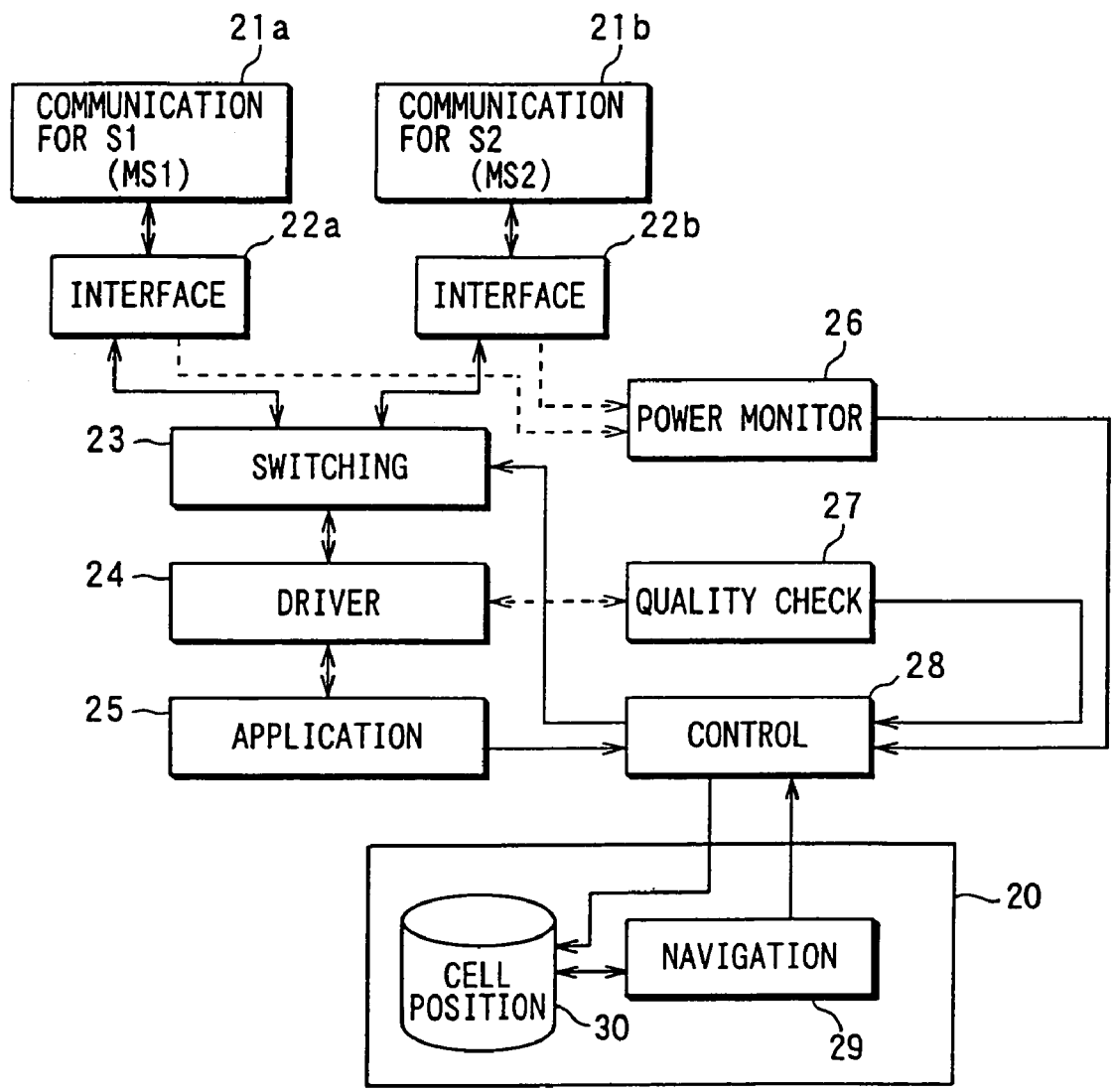
FIG. 9 is a schematic diagram showing a mobile terminal in a second embodiment of the present invention.

FIG. 9 shows the arrangement of a mobile terminal that is used for a wireless communication system of a second embodiment. In this embodiment, the mobile terminal 20 is assumed to have a navigation system. In the case that route guidance by a navigation system is available, a vehicle's driver should drive a vehicle along the guided route. Accordingly, in the case of movement along the guided route, it is possible to know in advance the order of switching of communication systems. This processing enables smooth switching of communication systems.

Therefore, the mobile terminal 20 of this embodiment includes a navigation system 29 and a storage medium 30 for storing cell position information as shown in FIG. 9. It operates to switch communication systems by using these devices. The remaining portion of FIG. 9 is identical to the first embodiment.

The navigation system 29 releases the present location of mobile terminal 20 and route information in the case of route guidance to the control unit 28. The storage medium 30 stores cell position information indicative of the positions and ranges (e.g., center coordinates of circles and radii) of individual narrow cells 1-1, 1-2, 1-3, 1-4, etc. and wide cells 2-1, 2-2, 2-3, 2-4, 2-5, 2-6, etc. shown in FIG. 2.

Figure 10:
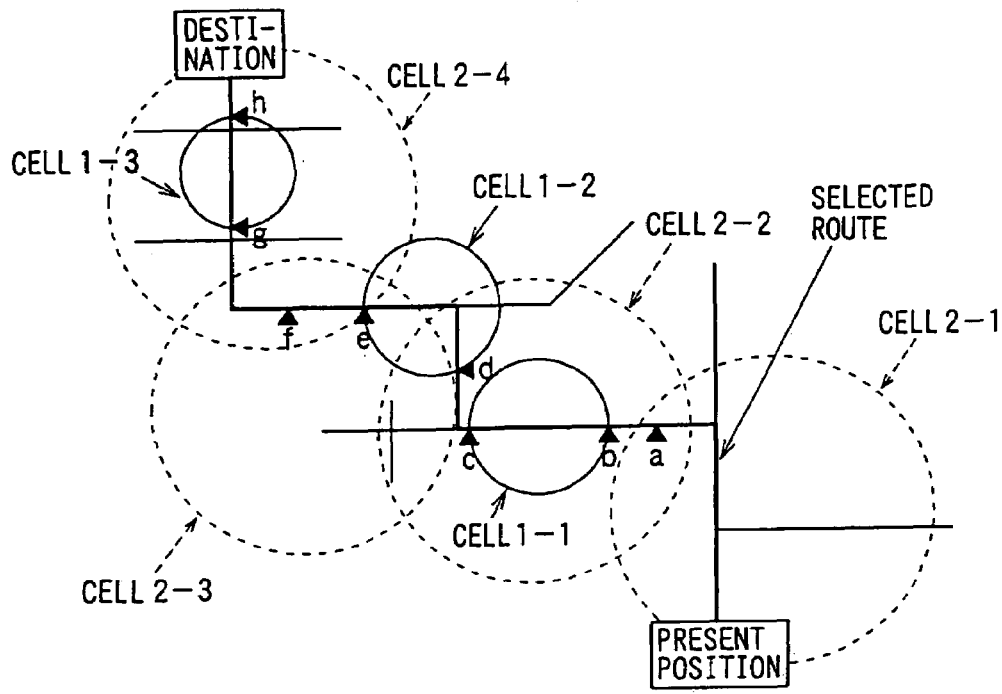
FIG. 10 is a schematic diagram showing the relation between route information and switching positions in the second embodiment.
Figure 11:
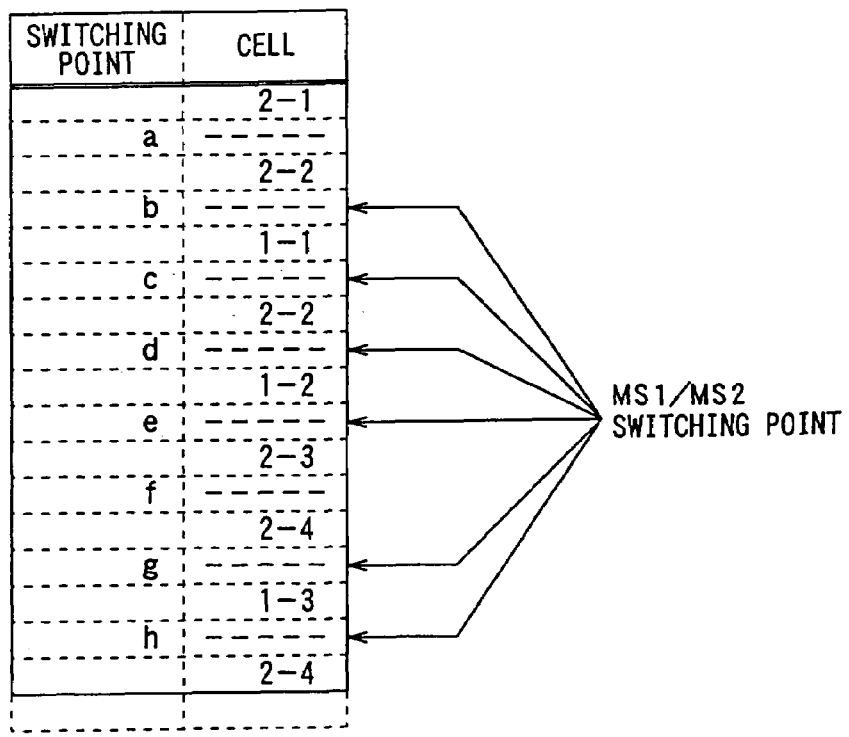
FIG. 11 is a data table showing the relation between switching points and cells in the second embodiment.

The navigation system 29, in the case of performing route guidance, sets a route from the present location to the destination as shown in FIG. 10. The control unit 28 checks the route information from the navigation system 29 and determines the switching positions of communication systems on the route, e.g., positions a through h in FIG. 10, based on the cell position information stored in the storage medium 30, thereby making a switching table as shown in FIG. 11. The switching table shown in FIG. 11 indicates the switching between communication system S1 and communication system S2 at positions b, c, d, e, g and h.

Figure 12:
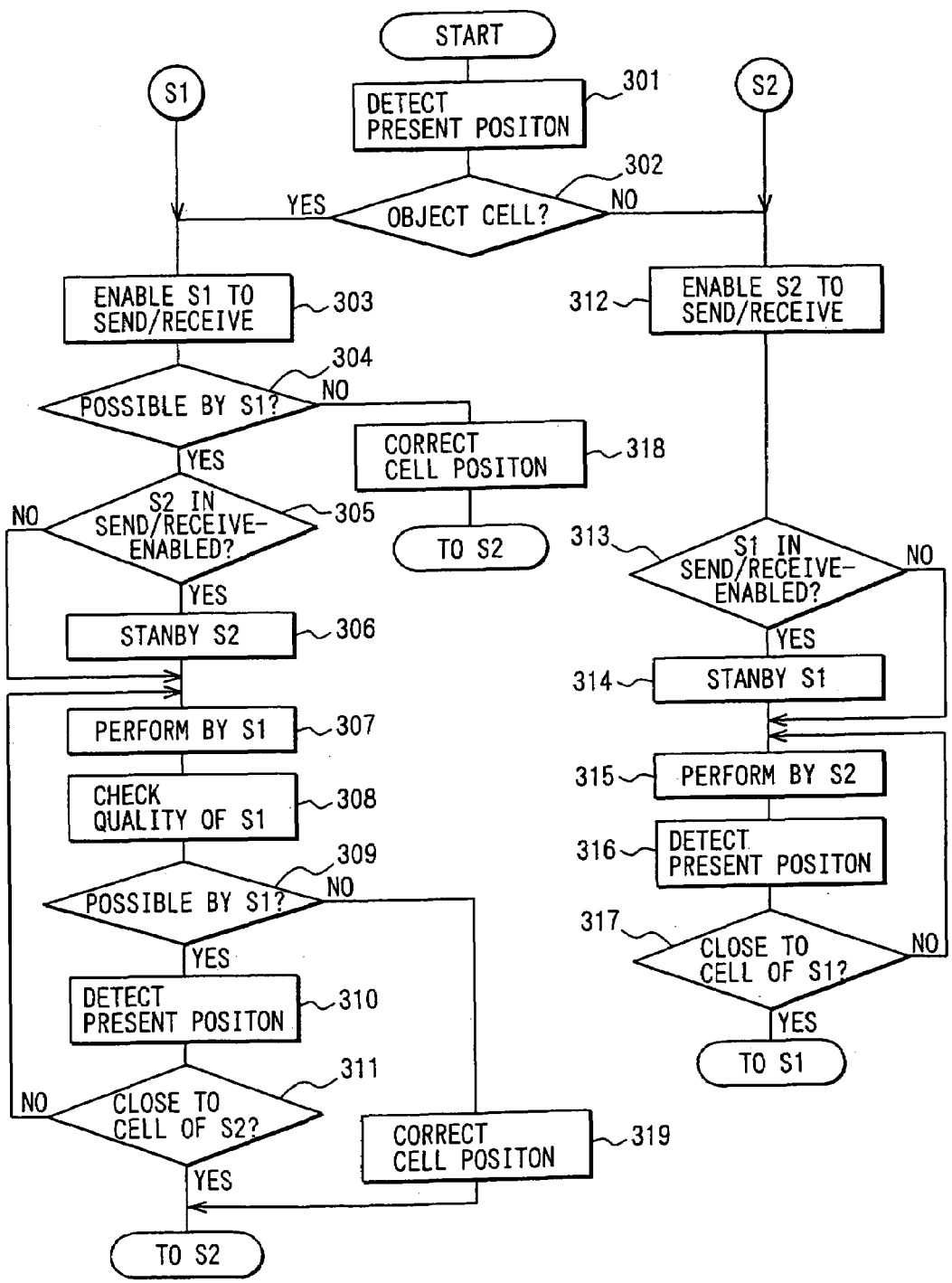
FIG. 12 is a flowchart showing control processing of the control unit in the second embodiment.

FIG. 12 shows the control processing of this second embodiment. Prior to the control processing, the control unit 28 makes a switching table as shown in FIG. 11 by making reference to the cell position information in the storage medium 30 based on the route information provided by navigation system 29.

The control unit 28 starts the control processing shown in FIG. 12, and checks information of the present location from the navigation system 29 (step 301). It determines based on the switching table as to whether or not the cell in use is an object cell of communication system S1 (step 302). If the cell in use is an object of communication system S1, it brings communication system S1 into the send/receive-enabled state (step 303).

Next, it determines whether or not communication using communication system S1 is possible, based on the received signal strength of communication system S1's transmissions as detected by the receiving power monitor 26 (step 304). If communication by using communication system S1 is possible, it determines whether or not communication system S2 is in the send/receive-enabled state (step 305). If communication system S2 is in the send/receive-enabled state, it brings communication system S2 into the standby state (step 306).

The control unit 28 controls the network driver 24 to perform communication using communication system S1 (step 307). It checks communication quality using the communication quality checking unit 27 during the communication using communication system S1 (step 308). It determines based on the checking of communication quality as to whether or not communication by use of communication system S1 can be maintained (step 309). In the case that communication by use of the communication system S1 is possible, it obtains the current location from the navigation system 29 (step 310). It determines, based on the switching table, whether or not the current location is close to the switching position of communication system S2, i.e., whether or not the current location is within a certain distance from the switching position (step 311). Unless the present location is close to the switching position for communication system S2, it repeats the processing of step 307 through step 311.

If the present location is close to the switching position to communication system S2, it brings the communication system S2 into the send/receive-enabled state (step 312). It determines as to whether or not communication system S1 is in the send/receive-enabled state (step 313). If communication system S1 is in the send/receive-enabled state, it brings communication system S1 into the standby state (step 314).

Control unit 28 controls the network driver 24 to perform communication using communication system S2 (step 315). Next, it obtains the current location from the navigation system 29 (step 316). Then it determines, based on the switching table, whether or not the current location is close to the position for switching to communication system S1 (step 317). Unless the current location is close to the switching position for communication system S1, it repeats the processing of steps 315 through 317. If the current location is close to the position for switching to communication system S1, it proceeds to the foregoing step 303 to perform communication by using communication system S1.

When step 304 determines that communication by use of communication system S1 is not possible or when step 309 determines that communication by use of communication system S1 cannot be maintained, indicative of erroneous cell position information stored in the storage medium 30, control unit 28 corrects the cell position information and proceeds to communication by use of communication system S2. That is, if cell position information is not necessarily correct, the mobile terminal 20 checks the information and modifies the cell position information by learning if it is erroneous.

Although the foregoing embodiment is designed to get the route information from the navigation system 29 and switch communication systems based on the relation with the present location, an alternative scheme is to only get information of the current location from the navigation system 29 and determine the communication system to be used from the present location and cell position information.

This embodiment can also be applied to the case of three or more communication systems as in the case of the first embodiment.

(Third Embodiment)

Figure 13:
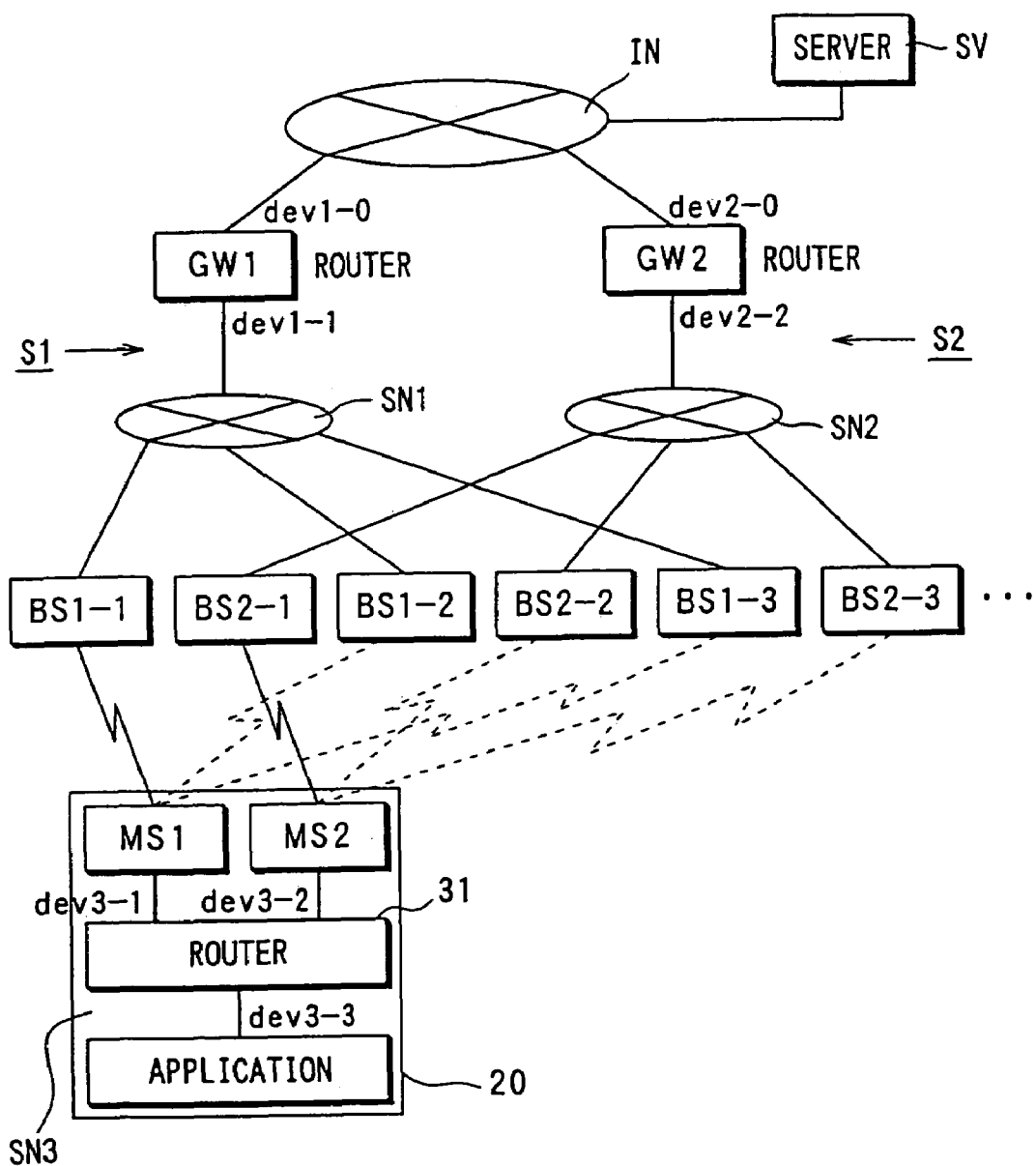
FIG. 13 is a schematic diagram showing a wireless communication system according to a third embodiment of the present invention.

FIG. 13 shows a wireless communication system designed to switch communication systems between the mobile terminal 20 and the server SV by using routers. Specifically, the gateways GW1 and GW2 also function as routers, and mobile terminal 20 switches the connection between the communication systems S1 and S2 and the application unit 25 by using a router 31. The remaining portion of FIG. 13 is identical to the first embodiment.

Figure 14:
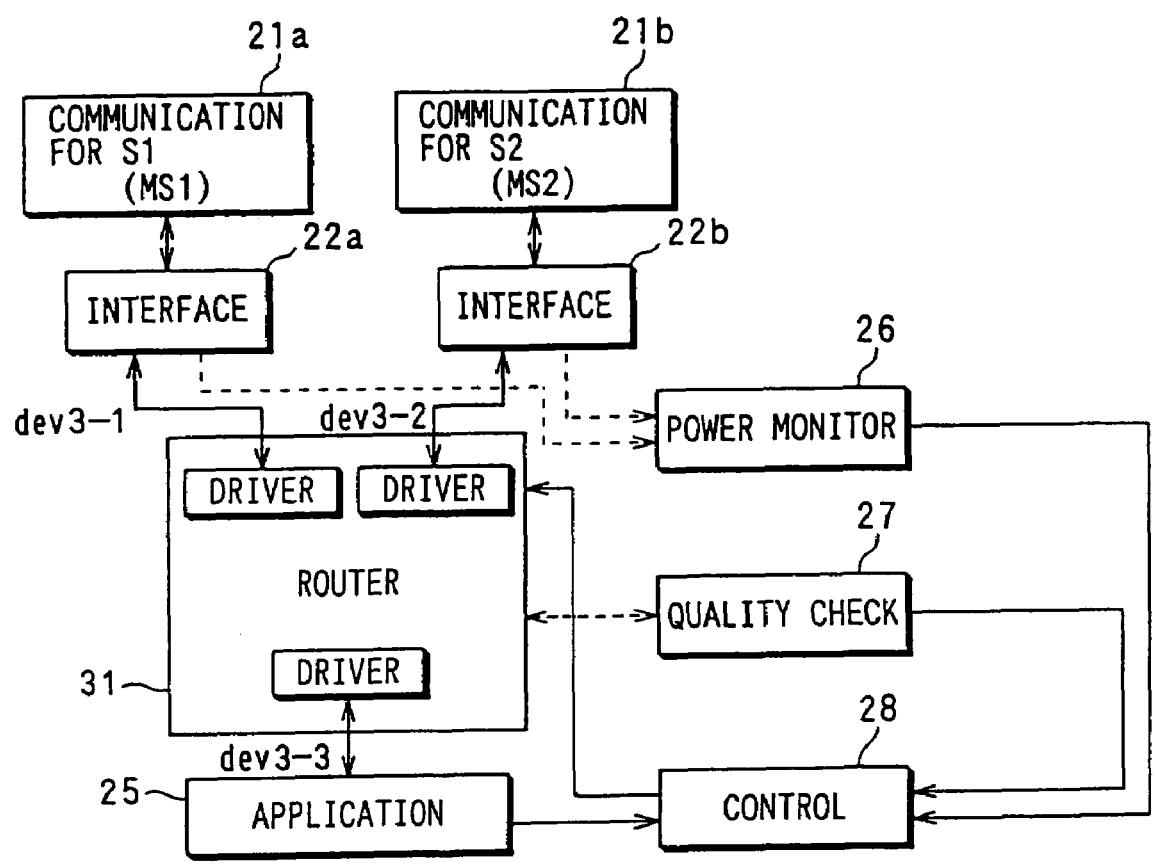
FIG. 14 is a block diagram showing the mobile terminal in the third embodiment.

FIG. 14 shows the specific arrangement of the mobile terminal 20. In this embodiment, the router 31 is used in place of communication system switching unit 23 shown in FIG. 3. The router 31 can be implemented on a software basis. The router 31 selectively connects the driver dev3-1 for the interface 22*a* of the communication system S1 or the driver dev3-2 for the interface 22*b* of the communication system S2 to the driver dev3-3 for the application unit 25.

The routers of the gateways GW1 and GW2 and the router of the mobile terminal 20 implement the routing by using routing tables. FIG. 16 shows the provision of the routing tables R1 and R2 for the gateways GW1 and GW2, respectively, and a routing table R3 for the router. These routing tables R1–R3 have their contents revised depending on which of the communication systems S1 and S2 can be used for communication.

FIG. 16A shows an example of the routing tables R1–R3 in the case of communication using communication system S1. FIG. 16B shows an example of the routing tables R1–R3 in the case of communication using communication system S2.

In the case of communication using communication system S1, it is assumed that the routing table R1 of the gateway GW1 is given dev1-1 for sub-network SN1 and for sub-network 3 (the section where the application software runs) and dev1-0 for the other. The routing table R2 of the gateway GW2 is given dev2-2 for sub-network SN2 and dev2-0 for the other. The routing table R3 in the mobile terminal 20 is given dev3-3 for sub-network 3 and dev3-1 for the other.

Figure 15:
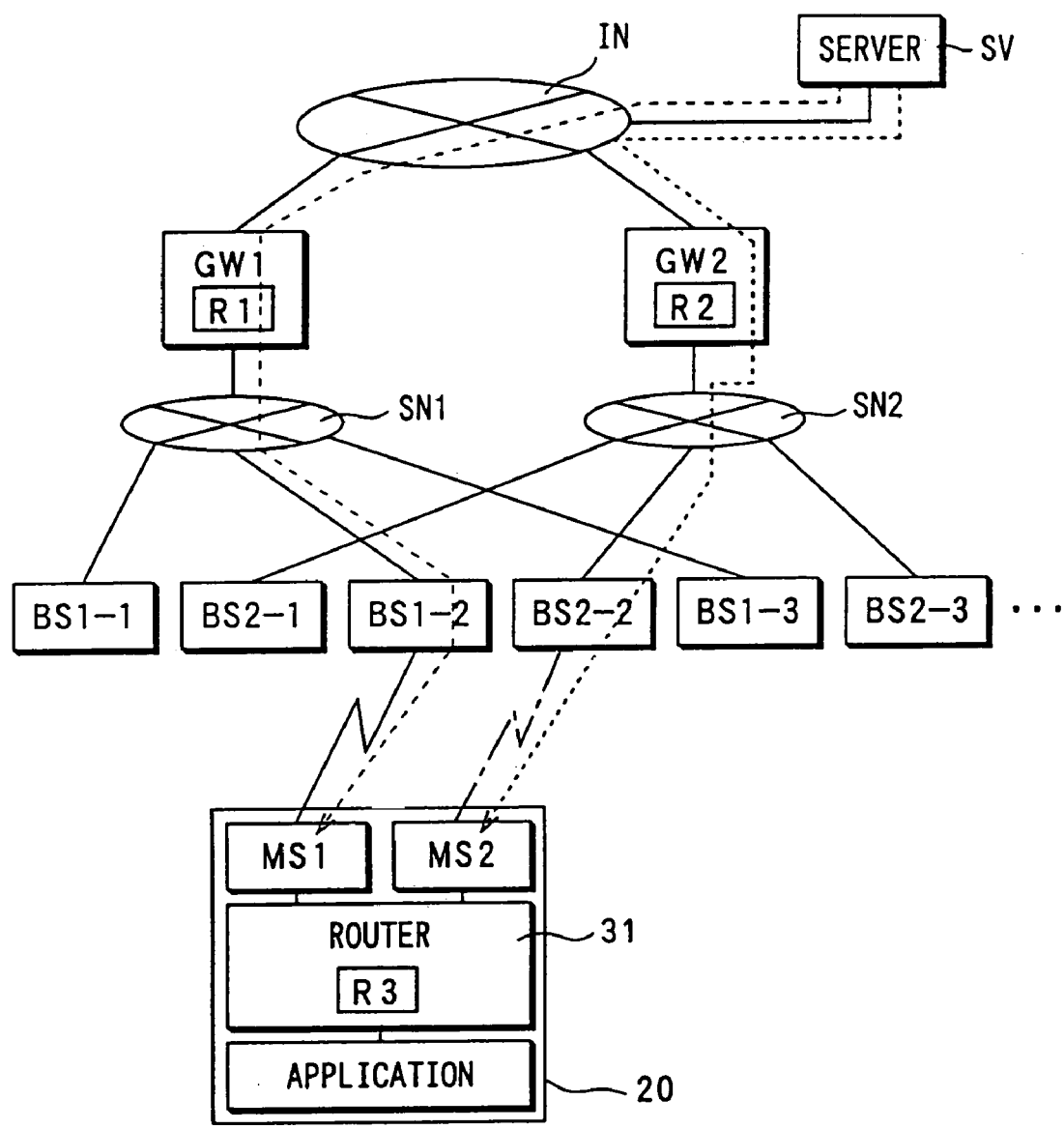
FIG. 15 is a schematic diagram showing switching of communication systems by routing in the third embodiment.

At transmission of data from the server SV to the mobile terminal 20, if sub-network 3 is designated, the server SV releases data to dev1-1 since sub-network 3 is contained in the routing table R1 of the gateway GW1. The released data is transmitted from any base station BS1 (BS1-2 in FIG. 15) of communication system S1 to the mobile terminal 20. Mobile terminal 20 receives the transmitted signal by using communication system S1. The router 31 has sub-network 3 in the routing table R3, and the received signal from communication system S1 is fed to dev3-3.

In the case of transmission of data from mobile terminal 20 to the server SV, if the application unit 25 designates "other", data from the application unit 25 is fed to dev3-1 and then data is sent from communication system S1 to the gateway GW1 by way of any base station BS1 (BS1-2 in FIG. 15) of the communication system S1. The gateway GW1 makes reference to the routing table R1 to release the received data to dev1-0, and it is transmitted to the server SV.

In this manner, for the case of using communication system S1, routing of the down-link and up-link takes place.

In the case of communication by use of communication system S2, routing of the down-link and up-link takes place by use of the routing tables R1–R3 shown in FIG. 16B in the same manner as explained above.

Figure 17:
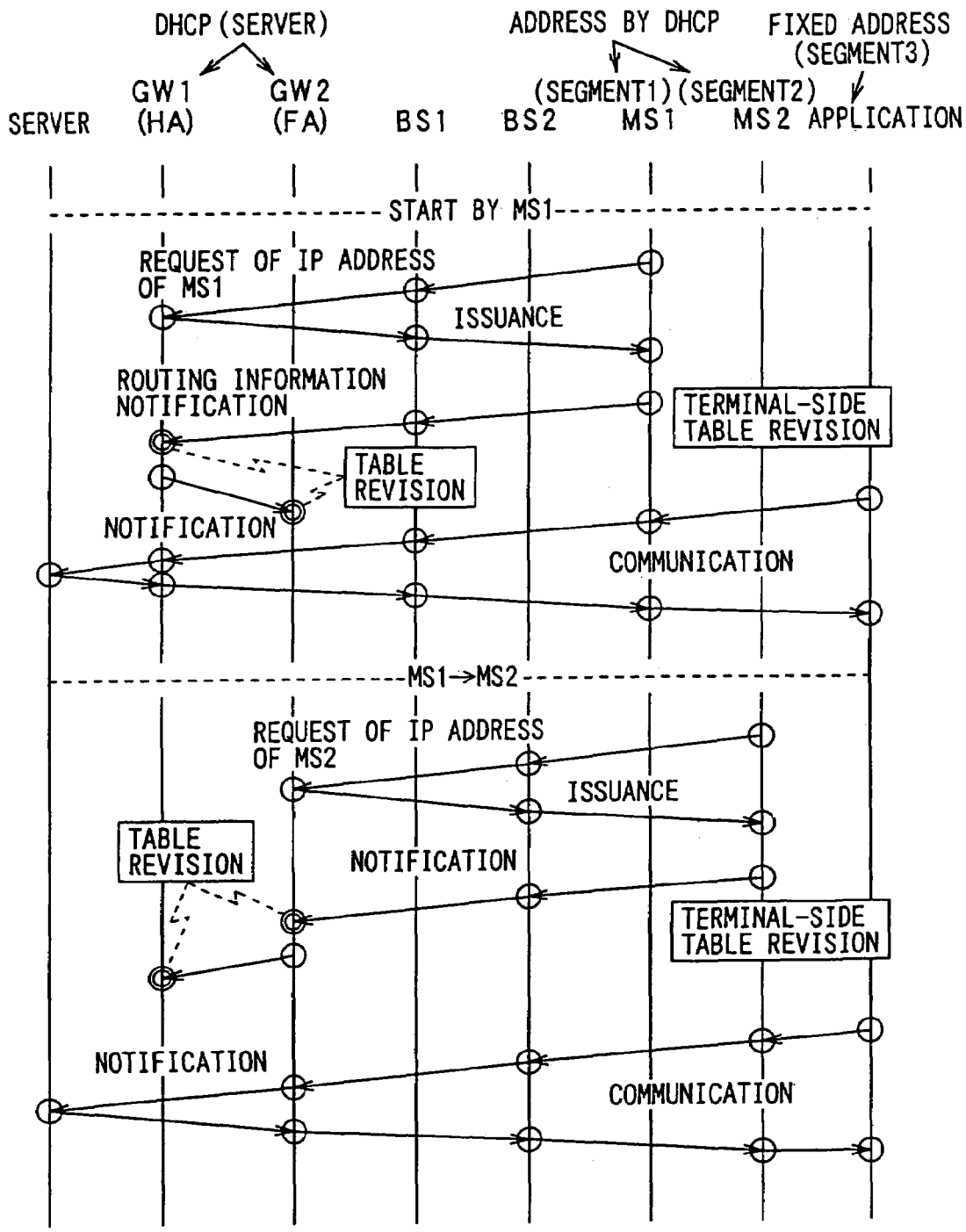
FIG. 17 is an operation diagram showing the signal transaction in the case of revising the routing table in the third embodiment.

Accordingly, for switching between communication system S1 and communication system S2, the routing tables R1–R3 are updated (rewritten). FIG. 17 shows the transaction of signals when the routing tables R1–R3 are updated.

Initially, when communication starts by using communication system S1, mobile terminal 20 requests the IP address of the communication system S1 to the gateway GW1 using communication system S1. Since the gateway GW1 also functions as DHCP server SV, as in the case of the first embodiment, it responds to the IP address request to issue the IP address of communication system S1 to mobile terminal 20. Then, mobile terminal 20 revises the routing table R3 as shown in FIG. 16A.

Next, mobile terminal 20 notifies its updates of routing tables R1 and R2 (as shown in FIG. 16A) to the gateway GW1 by using communication system S1. This routing information is further transferred from the gateway GW1 to the gateway GW2 via the Internet IN. The gateways GW1 and GW2 updates the routing tables R1 and R2 based on the routing information as shown in FIG. 16A. By using these routing tables R1–R3, communication with the server SV can take place based on the application software.

When the mobile terminal 20 switches from communication system S1 to communication system S2, it requests the IP address of the MS2 from the gateway GW2 by using communication system S2. Since the gateway GW2 also functions as the DHCP server SV, as in the case of the first embodiment, it responds to the IP address request by issuing the IP address of the MS2 to the mobile terminal 20. Then, mobile terminal 20 revises the routing table R3 accordingly, as shown in FIG. 16B.

Next, mobile terminal 20 notifies its updates of routing tables R1 and R2 (as shown in FIG. 16B) to the gateway GW2 by using the communication system S2. This routing information is further transferred from the gateway GW2 to the gateway GW1 via the Internet IN. The gateways GW1 and GW2 revise the routing tables R1 and R2 based on the routing information as shown in FIG. 16B. By using these routing tables R1–R3, communication with the server SV can take place based on the application software.

According to this embodiment, the router 31 is placed between communication systems S1 and S2 and the section where the application software runs, with the application software having a specific sub-network (sub-network SN3) address, so that communication with a same caller's address can take place. In consequence, even without tunneling by mobile IP, switching of communication system without interruption can take place. Owing to the absence of IP tunneling, there is no overhead of transmission and efficient communication can take place.

The data communication route can be selected from among communication systems S1 and S2 based on the rewriting of the routing tables R1–R3, and switching of communication systems can take place smoothly.

The control unit 28 of this embodiment implements the same control processing as the first and second embodiments except for the rewriting of the routing tables as described above. Specifically, the part of processing for performing communication by use of communication systems S1 and S2 in the first and second embodiments is replaced with the updating of the routing tables R1–R3.

Alternate embodiments for router 31 are obvious to one of ordinary skill in the art, all of which would provide a switching means to accomplish the routing function.

This embodiment can also be applied to the case of three or more communication systems as in the cases of the first and second embodiments.

In the foregoing first through third embodiments, each section of the mobile terminal is understood to be a means of accomplishing its intended function.

What is claimed is:

1. A wireless system comprising:
a mobile terminal; and
a plurality of communication systems for communication with the mobile terminal, the communication systems being different in service area of cells from each other; wherein
each of the communication systems has base stations belonging to a sub-network which is unique to the communication system, each sub-network being connected to an Internet by way of a gateway provided for the sub-network, and
the mobile terminal has a plurality of mobile station network interfaces which can access the communication systems respectively, and means for switching the communication systems accessed by the mobile station network interfaces based on cell position information of cells which are formed by the base stations of the communication systems and the present location of the mobile terminal and depending on the cell at the present location;
the mobile terminal has a navigation system which provides a routing guidance from a present location to a destination; and
the communication system switching means sets switching positions of the communication systems based on the cell position information and route information of the route guidance by means of the navigation system, and carries out switching depending on a relation between the switching positions and the present location by setting a position of switching based on the cell position information and the route information and switching the communication systems when the present location becomes the set position of switching.

2. A mobile terminal for a wireless system that has:
a plurality of communication systems for communication with the mobile terminal, the communication systems being different from each other, wherein
each of the communication systems has base stations belonging to a sub-network which is unique to the communication system, each sub-network being connected to an Internet by way of a gateway provided for the sub-network, and
the mobile terminal comprises a plurality of mobile station network interfaces which can access the communication systems respectively;
switching means for switching between the communication systems wherein the switching means switches the communication systems accessed by the mobile station network interfaces based on the cell position information of cells which are formed by the base stations of the communication systems, a current location of the mobile terminal, and depending on the cell at the current location; wherein
the switching means switches between the communication systems based on the cell position information and route information in a case of implementation of route guidance of the mobile terminal by a navigation system, and carries out switching by comparing switching positions and the current location.

3. The mobile terminal as in claim 2, further comprising means for modifying the cell position information, wherein said means for modifying the cell position information determines before switching at a next switching position that communication by use of the communication system in current use cannot be maintained.

4. A wireless system comprising:
a mobile terminal; and
a plurality of communication systems for communication with the mobile terminal, the systems being different from each other, characterized in that
each of the communication systems has base stations belonging to a sub-network which is unique to a one of said plurality of communication systems, each of said communication systems being connected to an Internet by way of a gateway provided for the sub-network, the gateway having a router function for routing between the internet and the sub-network, and the mobile terminal has a plurality of mobile station network interfaces, each of which can access a different one of the plurality of communication systems, and means for routing application software located between the mobile station network interfaces and a section running the application software, said means for routing the application software thereby switching the communication systems by connecting the section running the application software to any one of the mobile station network interfaces.

5. The wireless system as in claim 4, wherein each of the gateways and the means for routing the application software have routing tables used for the routing, and means for revising contents of the respective routing tables.

6. The wireless system as in claim 5 wherein said means for revising contents of the respective routing tables is responsive to a command from the mobile terminal to update said routing tables.

* * * * *